United States Patent [19]

Colwell

[11] Patent Number: 4,464,227
[45] Date of Patent: Aug. 7, 1984

[54] METHODS AND APPARATUS FOR DISTILLING A CONTAMINATED SOLVENT

[75] Inventor: Darrel R. Colwell, Oklahoma City

[73] Assignee: AT&T Technologies, Inc., New York, N.Y.

[21] Appl. No.: 418,946

[22] Filed: Sep. 16, 1982

[51] Int. Cl.³ .............................................. B01D 3/02
[52] U.S. Cl. .................................... 202/170; 202/176; 134/12; 159/34; 159/43.1; 203/99
[58] Field of Search ........................ 202/170, 188, 176; 159/33, 34, 43 R; 203/DIG. 22, 7, 99, DIG. 25; 134/12

[56] References Cited

U.S. PATENT DOCUMENTS

| | | | |
|---|---|---|---|
| 2,089,102 | 8/1937 | Savage | 202/170 |
| 2,313,175 | 3/1943 | Scott et al. | 203/89 |
| 2,385,860 | 10/1945 | Jesson | 202/170 |
| 2,618,577 | 11/1952 | Bash | 202/170 |
| 2,818,373 | 12/1957 | Ockrent | 202/205 |
| 3,163,587 | 12/1964 | Champe | 203/10 |
| 3,342,703 | 9/1967 | Leach | 203/7 |
| 4,091,826 | 5/1978 | Bahrke | 134/12 |
| 4,282,096 | 8/1981 | Burkert | 210/182 |
| 4,344,825 | 8/1982 | Colwell | 209/11 |
| 4,437,968 | 3/1984 | Elliot, Jr. | 159/23 |

FOREIGN PATENT DOCUMENTS

12907  5/1978  Japan ................................. 202/170

*Primary Examiner*—Wilbur Bascomb
*Assistant Examiner*—V. Manoharan
*Attorney, Agent, or Firm*—R. P. Miller

[57] ABSTRACT

A charge of distilland (33) is metered into a heated inclined trough (18) within a chamber (10). Vapors of distilland rise to a level (41) which is below the upper level (26) of the trough. The vapors spill over the sides (31 and 32) of the trough and fall to the lower section of the chamber where cooling coils (42) condense the vapors and the resultant distillate flows out an exit conduit (122). Residue materials are moved by a pusher (47) over the end (26) of the trough into a drain chute (51). During the return of the pusher, an air cylinder (103) is operated to lift the pusher from the bottom of the trough.

4 Claims, 8 Drawing Figures

METHODS AND APPARATUS FOR DISTILLING A CONTAMINATED SOLVENT

FIELD OF THE INVENTION

This invention relates to methods and apparatus for distilling a contaminated solvent and, more particularly, to distillation processes wherein the solvent is vaporized to rise to a predetermined level and then fall into a condensation zone and in which residue contaminants are exited at a point above the predetermined level into a discharge facility.

BACKGROUND OF THE INVENTION

In U.S. Pat. No. 4,344,825 issued Aug. 17, 1982, to D. R. Colwell, there is described a distillation system wherein spent cleaning solvent, such as used to clean printed circuit boards, is reclaimed by passage through a pair of distillation chambers. The spent solvent distilland is initially distilled in a conventional distillation chamber and then metered amounts of residue slurry are advanced into a second chamber. In this second chamber each metered charge is deposited on a heated plate in front of one of an array of rotating blades. A blade engages and wipes each charge of slurry over the heated plate to vaporize entrapped solvent which rises and is condensed and returned to the first distillation chamber, whereafter the blade advances the remaining residue to a discharge conduit.

Many other distillation systems have been devised wherein distilland is flowed onto one or more heated plates over which the distilland is moved while being vaporized. U.S. Pat. No. 2,313,175 issued Mar. 9, 1943, to R. F. Scott et al. shows a vacuum chamber with a stack of spaced heating plates that are rotated to centrifugally move a distilland over the edge of an upper plate and onto successive lower plates in the stack. Portions of the distilland are vaporized by each heated plate to form rising vapors which are condensed and recovered. The residue distilland on the lowermost plate is exited from the distillation chamber.

In U.S. pat. No. 2,818,373 issued Dec. 31, 1957, to C. Ockrent, there is disclosed a vacuum distillation chamber having a single heated plate for receiving a distilland which is spread by a rotating scraper cooperating with the face of the plate to form vapors which rise and are condensed on the inside of the top surface of the chamber. Residue products are pushed to the edge of the plate and allowed to fall and drain from the chamber through an exit pipe at the bottom of the chamber.

There is still a need for a distillation system comprising a single distillation chamber wherein the distillation is accomplished at atmospheric pressure, and wherein discrete charges of distilland may be distilled in such a fashion that all of the distilland is recovered and the residue may be subsequently cyclically discharged in a condition that is substantially free of the distilland.

SUMMARY OF THE INVENTION

The invention contemplates, among other things, a method and apparatus for distilling a charge of distilland by heating the charge in a chamber at atmospheric pressure to drive off vapors which rise to a predetermined level and fall into a cooling section where the distillate is collected and exited from the chamber, whereafter residue products are pushed into a discharge chute having a mouth above the level of the vapor.

More particularly, the invention contemplates placing a distilland charge of a solvent contaminated with rosin flux and other constituents in a lower end section of a heated incline trough mounted within a chamber at atmospheric pressure. The distilland is heated to drive off vapors to form a vapor layer which has a definitive upper level beneath the level of a mouth of a discharge chute so that none of the vapors fall into the discharge chute. The vapors spill over the sides of the trough and fall toward the bottom of the chamber. Coolant is flowed around or through the lower section of the chamber to condense the vapors, whereafter the resultant distillate is exited from the chamber. Following a distillation operation, a pusher with a wiper blade is moved along the trough to advance the residue contaminants into the mouth of the chute which runs to a collection barrel positioned outside of the chamber.

BRIEF DESCRIPTION OF DRAWINGS

Other features and advantages of the invention will be apparent from the following detailed description when considered with the drawings, wherein.

DETAILED DESCRIPTION

As a step in many manufacturing processes, a fabricated or partially fabricated part is cleaned by spraying or immersion in a solvent. After a period of time, the solvent becomes contaminated and must be rejuvenated or replaced. One such solvent, perchloroethylene, is used to clean printed circuit boards following a soldering operation wherein the board is successively conveyed through a flux applicator and then a solder wave. The perchloroethylene or other solvent removes residual flux, e.g., rosin, grease and other debris from the board so that after a period of time the solvent may be considered as being spent.

Such spent solvent may be rejuvenated by distillation in a chamber 10 of the present invention. The chamber is constructed with a removable lid 11 having a window 12 formed therein for viewing and monitoring the distillation action. Distillation may take place under atmospheric pressure and the chamber is provided with a vent 13 which serves to insure the substantial maintenance of the atmospheric pressure within the chamber. Looking at FIGS. 2, 3 and 4, a charge of spent solvent is metered into the chamber through an inlet tube 16 having a downwardly extending spout 17 overlaying a side section of an inclined trough 18.

Figure 2:
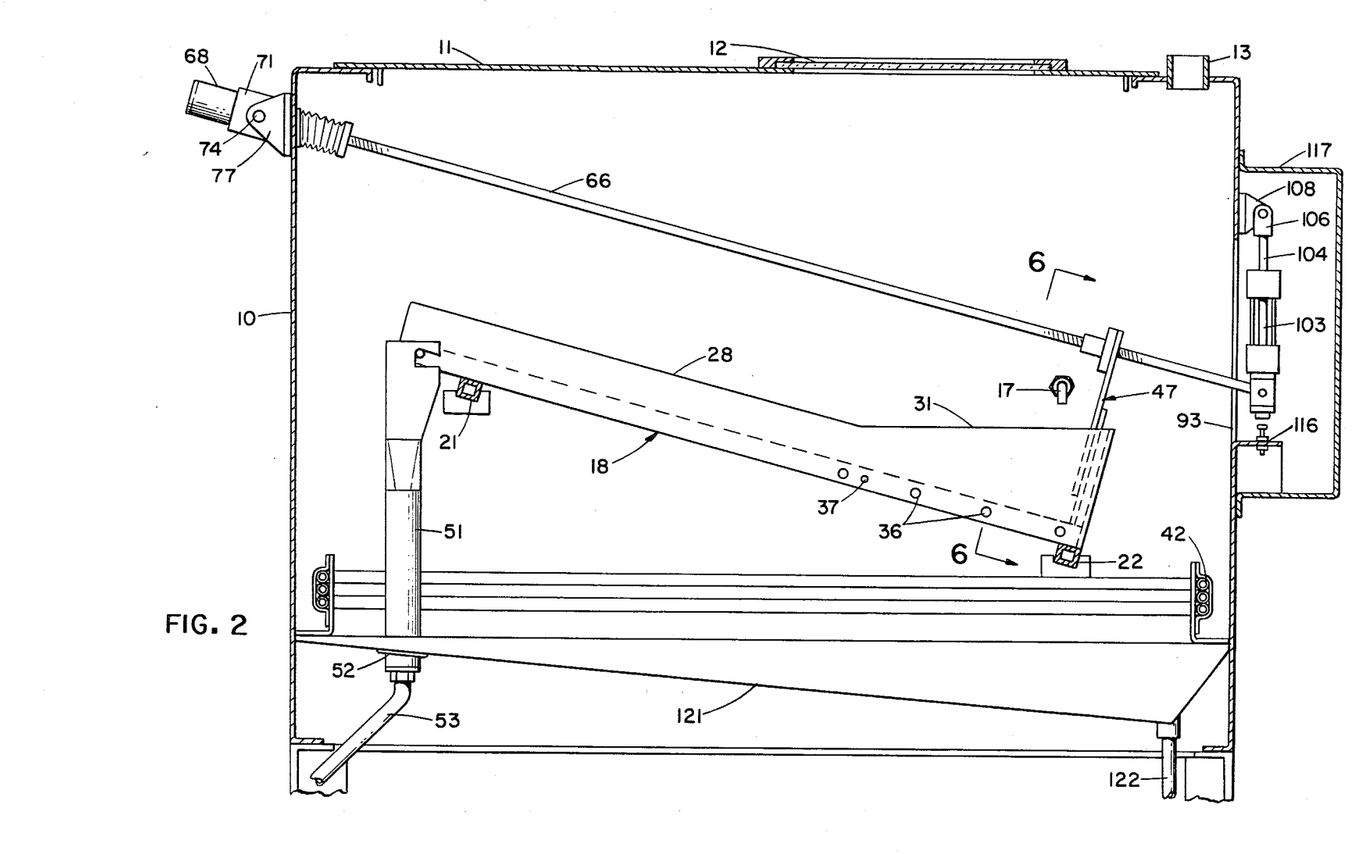
FIG. 2 is a side sectional view through the chamber showing an inclined distillation trough together with fluid ingress and egress facilities embodying certain principles of the present invention.
Figure 3:
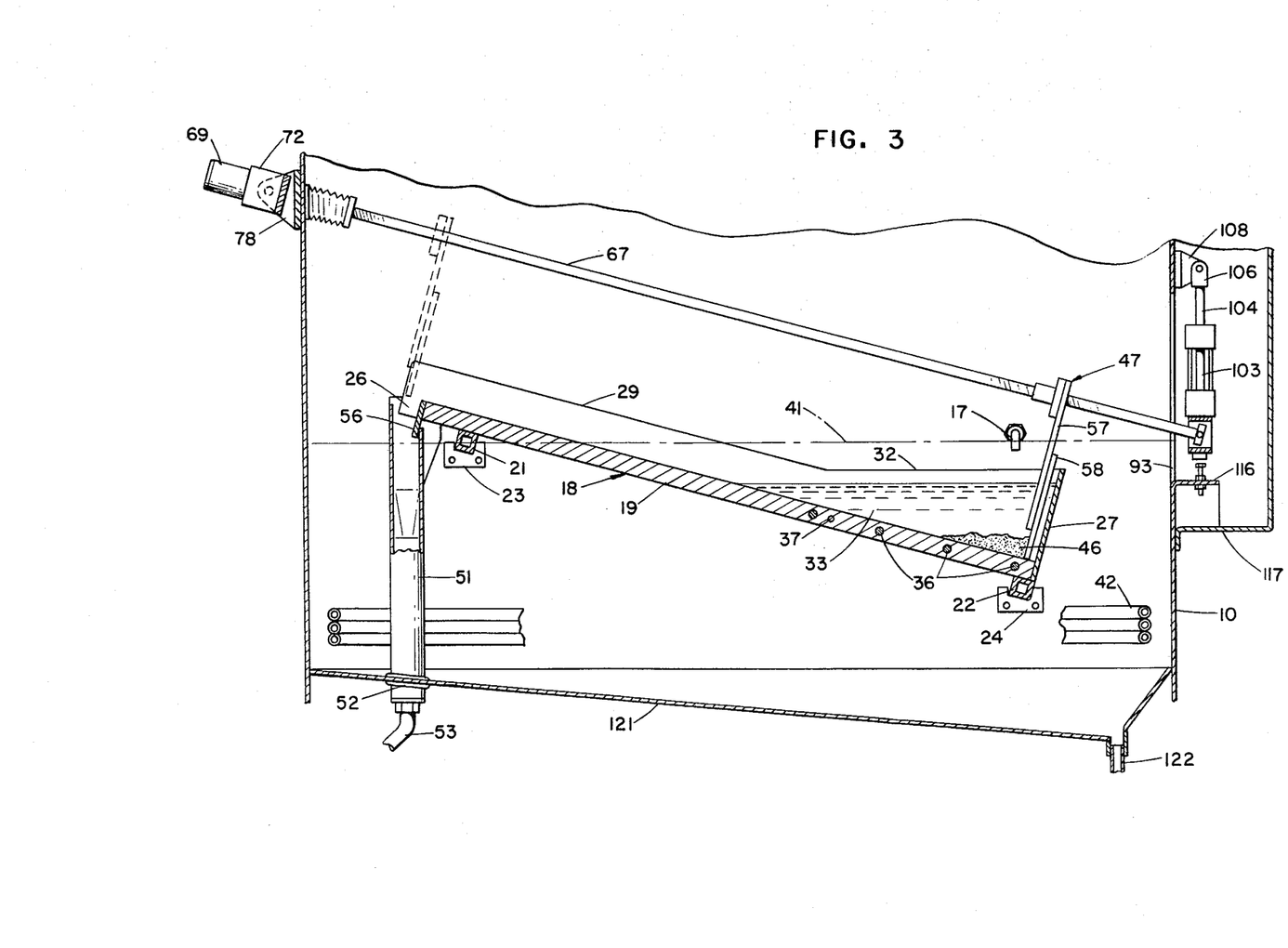
FIG. 3 is another side view similar to FIG. 2 which is partially cut away to illustrate the presence of a charge of distilland in the inclined trough and the details of a discharge chute for the residue of the distillation.
Figure 4:
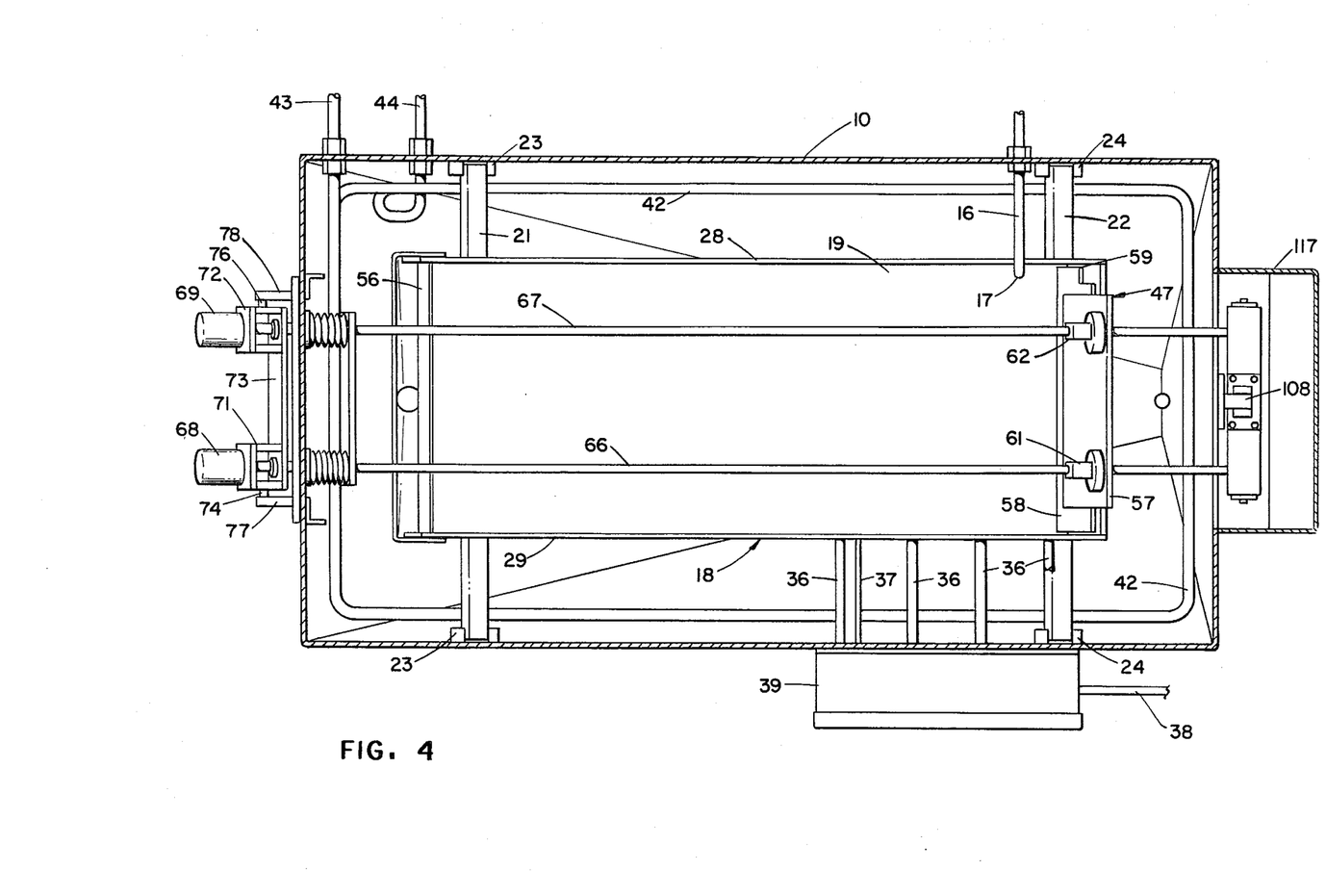
FIG. 4 is a top plan view of the interior of the distillation chamber showing the construction of a wiper or scraper device for exiting residue slurry following a distillation operation.

Trough 18 comprises a bottom plate 19 resting on and secured to a pair of closed channel girders 21 and 22 supported in angular positions by pairs of brackets 23 and 24 secured to opposed side walls of the chamber 10. The trough 18 is open at an upper end section 26 and enclosed at a lower end by a wall plate 27. The sides of the trough are defined by opposed plates 28 and 29 having inclined sections terminating in horizontal sections 31 and 32. The end plate 27 and the horizontal sections 31 and 32 of the side walls together with the sloping bottom plate define the perimeter of a pool section for accumulating a charge 33 of distilland metered through the spout 17.

The bottom plate 19 is formed with a plurality of transverse bores to receive a number of commercial heating rods 36 and a thermocouple or other heat sensor 37. Circuitry for these electrical elements includes a cable 38 (see FIG. 1) running into a box 39 secured to the side wall of the chamber 10. The heater elements 36 are controlled through the agency of a commercial control circuit which responds to readings obtained by the thermocouple 37 so that sufficient heat is provided to vaporize the charge 33 of solvent. The mass of the bottom plate 19 acts as a heat reservoir or sink to distribute the heat and, thus, insures a sustained uniform heating of the bottom of the solvent pool. Sufficient heating effect is provided so that the solvent is vaporized to form a layer of vapors that rise to a level designated by the reference numeral 41 in FIG. 3. The level 41 is not a finite line but rather a narrow zone, the upper limits of which are well below the upper end 26 of the trough.

Figure 1:
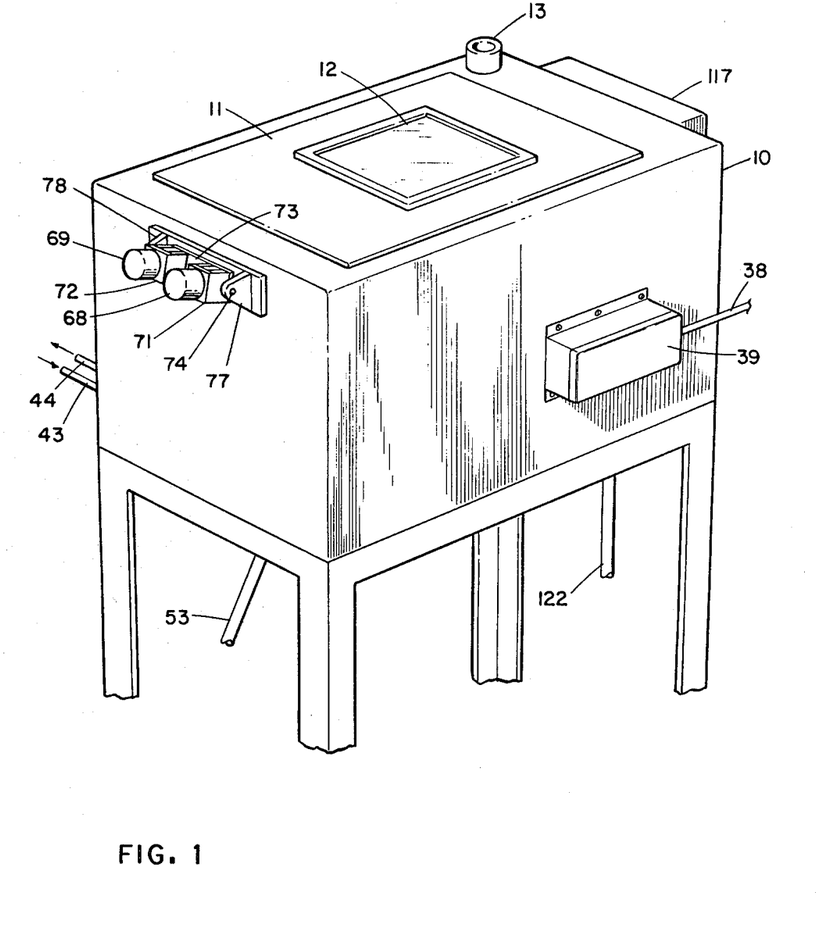
FIG. 1 is a perspective view of the outside of a distillation chamber particularly showing fluid and electrical conduits for controlling a distillation operation.

The vapors rise above the horizontal level of the side walls 31 and 32 and pour over the side walls and fall into the lower section of the chamber 10. Positioned about the lower section of the chamber 10 are coils 42 of tubing for circulating a cooling fluid, such as chilled water. The entry and exit tubes for the chilled water are shown in FIGS. 1 and 4 and designated by the numerals 43 and 44.

As a result of the distillation operation, a residue 46 (see FIG. 3) accumulates in the lower section of the trough in front of a pusher device 47. The residue 46 may consist of a slurry mixture of rosin flux, debris and other unvaporized constituents. The pusher advances the slurry mixture 46 along the trough and over the open end 26 of the trough where the slurry mix is exited into a drain chute 51 extending through a sealed fitting 52 to a drain conduit 53 running to a suitable collection vessel, such as a barrel. The thick slurry liquid is prevented from dripping back along the underside of the bottom plate 19 by a drip plate 56 secured to the upper end of the bottom plate.

Figure 6:
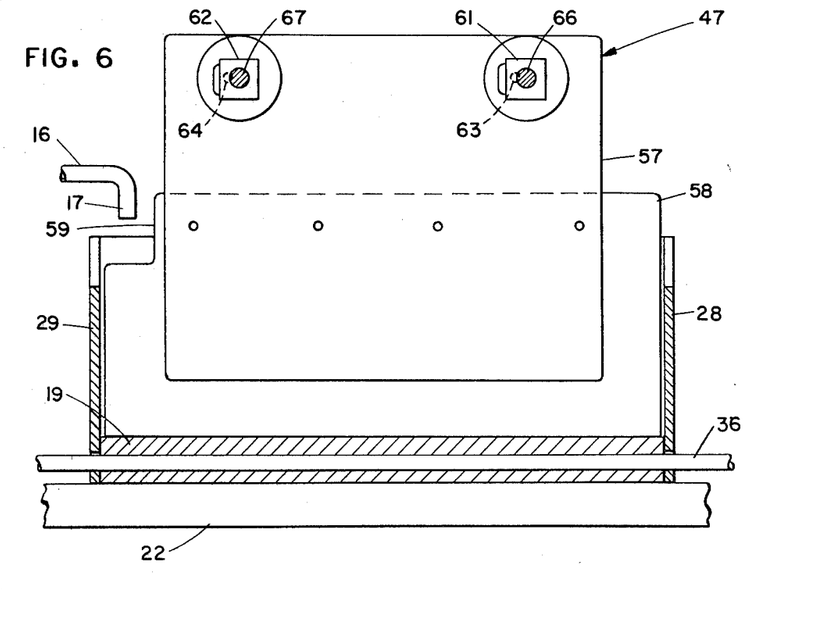
FIG. 6 is a sectional view taken along line 6—6 of FIG. 2 depicting the scraper positioned at the lower end of the trough.

The heating and the vaporization of the solvent 33 may be terminated by a timer control circuit (not shown) or by an operator observing the distillation through the window 12. In either event, the distillation is followed by an operation of the pusher to clean the residue from the trough 18. The pusher 47 includes a support frame 57 (see also FIG. 6) attached to a scraper or wiper blade 58. The outline of the blade 58 conforms to the shape of the trough defined by the plates 19, 28 and 29. The blade 58 is formed with a cut away section 59 so as to not strike the spout 17 when advanced along the trough 18. The frame 57 supports a pair of standard ball nut devices 61 and 62 with the balls 63 and 64 riding within a pair of helical threads formed on a pair of feed screws 66 and 67. Screws 66 and 67 are initially positioned on an incline that is substantially parallel to the incline of the bottom plate 19.

Figure 5:
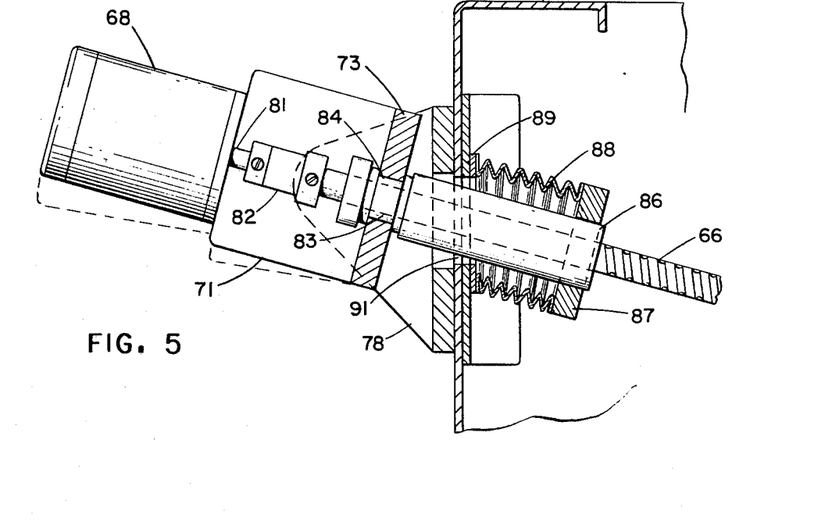
FIG. 5 is a side view partially broken away to show the details of construction of a device for reciprocating the scraper.

The upper inclined ends of the screws 66 and 67 (see FIGS. 3, 4 and 5) are connected to be driven in the same direction by a pair of motors 68 and 69. The motors are mounted on a pair of U-shaped housings 71 and 72 secured to a cross plate 73. The U-shaped housings 71 and 72 support trunnions 74 and 76 rotatably mounted in triangular-shaped brackets 77 and 78. The motor-screw couplings for both screws are the same and the details of construction of one is shown in FIG. 5. The motor 68 drives a shaft 81 and a coupling 82 which is attached to an unthreaded upper section of the screw 66. The upper end of the screw 66 is provided with a bearing 83 rotatably mounted in a bushing formed by an opening 84 formed in the cross plate 73. Secured to another section of the upper end of the screw 66 is a sleeve 86 mounted in a sealed cap 87 which, in turn, is secured to an accordian pleated boot 88. The upper end of the boot is securely fastened to a ring 89 attached to the inner wall of the chamber 10. It will be noted that this inner wall is provided with a hole 91 which is larger than the diameter of the sleeve 86 so that the sleeve 86 and the screw 66 may be pivoted without binding against the chamber wall. The boot seal arrangement is provided to insure that no stray noxious vapors are allowed to pass outside of the chamber.

When the motors 68 and 69 are selectively operated by a control circuit or an attending operator, the screws 66 and 67 are rotated in the same direction. The ball nuts 61 and 62 are prevented from rotation with the shaft by the reaction of the blade 58 against the bottom plate 19 of the trough. Inasmuch as the ball nuts cannot rotate, reactive forces of the balls against the rotating screw threads cause the ball nuts to advance along the screw threads to move the blade 58 to scrape the debris 46 up the inclined trough and into the discharge chute 51.

Figure 7:
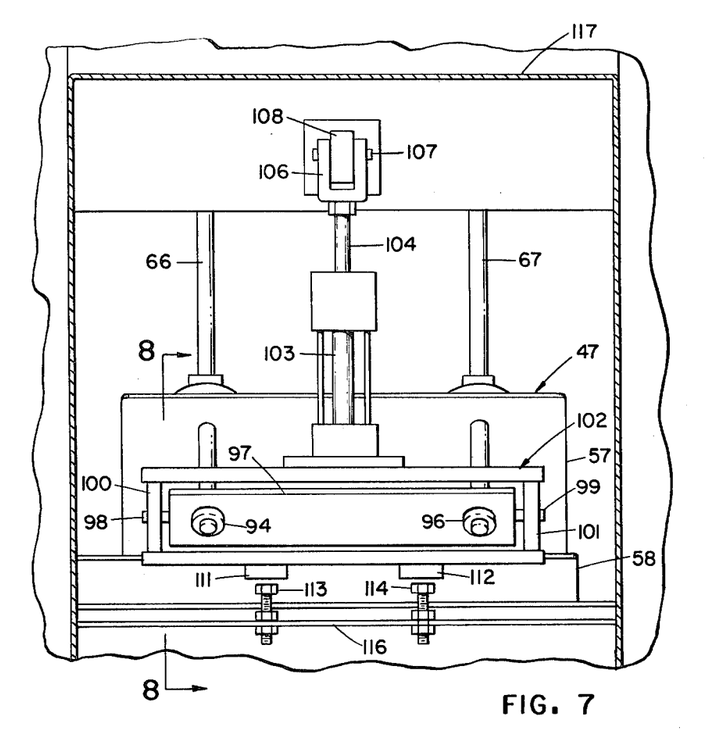
FIG. 7 is an end view of a part of the chamber showing an instrumentality for elevating the scraper during a return stroke.
Figure 8:
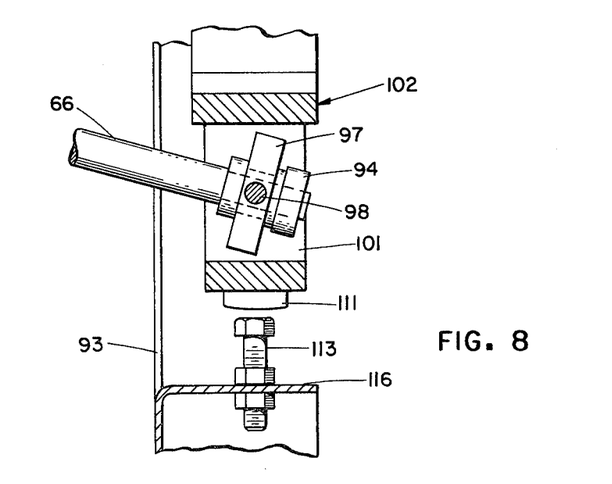
FIG. 8 is a sectional view taken along line 8—8 of FIG. 7 disclosing a pivotal mounting for a feed screw which functions to impart a reciprocating motion to the scraper.

Attention is directed to FIGS. 3, 7 and 8 for a consideration of the mounting of the lower end of the pusher feed screws 66 and 67. These screws extend through an opening 93 in the chamber wall. The ends of the screws are machined to provide bearing surfaces that fit within bearings 94 and 96 seated in a crossbar 97. Extending from opposite ends of the crossbar are a pair of stud shafts 98 and 99 rotatably journalled in a pair of end plates 100 and 101 of a rectangular frame 102. An upper plate of the frame 102 is secured to a fluid cylinder 103 having a piston rod 104 that is fastened to a clevis 106 having a pin 107 extending through a triangular mount 108 anchored to the rear wall of the chamber 10.

Normally some fluid pressure is applied to the lower end of the cylinder 103 to apply a slight thrust to the piston rod 104. Inasmuch as the upper end of the piston rod is held by the stationary clevis pin 106, there is a reaction force that pushes the cylinder down against the rectangular housing 102. As a result, the lower ends of the screws 66 and 67 are also thrust downwardly so that the pusher blade 58 is forced against the surface of the bottom plate 19 of the trough. It will be thus appreciated that during the movement of the pusher to scrape the slurry 46, the lower end of the blade 58 will be urged against the bottom of the trough 18.

Following an operation of the pusher 47 to discharge the residue slurry, the motors 68 and 69 are reversed to initiate a movement of the pusher back to the initial position in anticipation of another cycle of operation. At the time of a return movement of the pusher, the fluid applied to the cylinder 103 is reversed and the fluid acts to withdraw the piston 104 within the cylinder. Inasmuch as the piston rod is anchored by the stationary clevis pin, the cylinder 103 and the attached housing 102 will move upwardly in a slight arcuate path. Accompanying the upward movement of the frame, the screws 66 and 67 and the pusher 47 also move upwardly thus disengaging the pusher blade 58 from the bottom plate of the trough during the return of the pusher to the initial position.

The amount of wear on the scraper blade 58 may be determined by noting the down position of the cylinder 103 and the frame 102. In order to enhance this observation, the frame 102 is provided with a pair of projecting nubs 111 and 112 which are normally spaced from the heads of a pair of adjustable bolts 113 and 114 threaded into a shelf 116 projecting outwardly from the wall of the chamber 10. By checking the spacing between the heads of the bolts 113 and 114 and the nubs 111 and 112, an indication is attained as to the degree of wear of the blade 58 which rests on the bottom plate 19. The need for replacement may be readily ascertained by inserting a feeler gauge between the nubs and the bolt heads. When the feeler no longer passes into the space between the bolt heads and the nubs, the attendant will be apprised that the blade 58 needs replacement. The mounting for the lower ends of the screws 66 and 67 and the fluid cylinder 103 is encased in a removable housing 117. The housing 117 encloses the opening 93 and, thus, prevents noxious vapor fumes from escaping from the chamber. The possibility of escape is readily apparent by noting that the opening 93 extends below the vapor line 41.

In summary of the operation of the apparatus and the practice of the method, a metered amount of contaminated solvent is passed through spout 117 into the trough 18. A pool of spent solvent is accumulated in the lower incline section of the trough and rises to a level below that of the horizontal side wall sections 31 and 32 of the trough. The heated electrodes 36 act to vaporize the solvent to form a layer of vapors which rise to a level 41 which is beneath the upper end 26 of the trough. The vapors spill over the horizontal sides of the trough and flow into the bottom portion of the chamber 10 where the cooling coils 42 are effective to condense the solvent. The condensed solvent falls to a tapered lower bottom section 121 of the chamber 10 and flows out an exit conduit 122 to a recovery vessel.

The attendant will know approximately the time that it takes to vaporize the solvent and will look through the window 12 to observe the deposit of residue 46. The motors 68 and 69 are simultaneously operated, whereupon the screws 66 and 67 are rotated to advance the ball nuts 61 and 62 to move the pusher 47 up the inclined slope of the bottom plate of the trough. The residue 46 is received and exited through the drain chute 51. The motors are then reversed, and at the same time the fluid cylinder 103 is operated to lift the screws 66 and 67 to withdraw the scraper blade 58 from the inclined bottom plate 19. The motors are shut off upon after making a predetermined number of turns to restore the scraper blade to a position adjacent to the side wall 27 in anticipation of another cycle of operation of the apparatus.

What is claimed is:

1. A solvent distillation system, which comprises:
   a chamber;
   a trough within said chamber for receiving a charge of distilland;
   means for heating the trough to evaporate the distilland to form a vapor that rises to a predetermined level;
   means for mounting the trough at an incline with one end of the trough elevated to extend through the predetermined level of the vapor while the other end is below said vapor level and serves to concentrate the distilland charge;
   means movable along the trough for pushing the residue of the distilland toward and over the elevated end of the trough;
   said pushing means comprises a blade fitted to conform to an opening in the trough, a pair of spaced feed screws running parallel to the trough, a pair of ball nuts riding on the screws and secured to the pushing means, means for rotating the screws to advance the ball nuts along the screws and move the pusher means along the trough; and
   a discharge chute for receiving the residue pushed over the elevated end of the trough.

2. A solvent distillation system as defined in claim 1, which comprises:
   means for lifting the screws away from the parallel position when the motors are reversed to move the ball nuts back down the screws while the pusher means is elevated from the trough during the return of the pusher means to an initial position.

3. An apparatus for distilling a liquid comprising a volatile solvent and contaminants, which comprises:
   a chamber;
   a trough having an open first end and closed second end;
   means for mounting the trough at an incline within the chamber and with the open end elevated with respect to the closed end;
   a pusher having a wiper blade fitted within and across the width of the trough;
   a chute mounted within said chamber and having a mouth positioned at the open end of said trough for receiving a charge of contaminants;
   means for flowing a predetermined charge of liquid into the trough to form a pool of liquid in a distilling section of the trough adjacent to said closed end of the trough;
   means for heating said distilling section of the trough to vaporize the solvent to form a vapor which rises to a level beneath the open end of said trough, and falls toward the bottom of the chamber;
   means encircling the bottom section of the chamber for cooling and condensing the falling vapors;
   means for exiting the condensed solvent from the bottom of the chamber; and
   means for reciprocating the pusher to move the wiper blade from an initial position adjacent to the closed end of the trough to the open end of the trough to push residue contaminants into the chute whereafter the pusher and wiper are returned to the initial position.

4. An apparatus for distilling a charge of a mixture of a volatile solvent and contaminants, which comprises:

a chamber;

a trough mounted on an incline within the chamber, said trough having a channel of predetermined depth and upwardly extended side walls at the lower end, the tops of said side walls being in a horizontal plane;

an end plate secured across the lower end of the trough to form with the side walls a pocket for receiving a charge of the mixture;

a chute means having a mouth positioned beneath the upper end of the inclined trough and running through and out of the chamber;

means for heating the trough in the vicinity of said upwardly extended side walls to heat the charge placed in the pocket to vaporize the solvent to form vapors which spill over the side walls while leaving residue contaminants in the pocket;

a pusher mounted to slide along said channel to scrape the residue contaminants from the pocket and over the upper end of the trough into said chute means;

means positioned within the chamber and below the trough for cooling the vapors emanating from and spilling over the side walls of the trough;

means for reciprocating the pusher to scrape the residue contaminants along the channel and into the chute means during a forward stroke of the pusher; and means rendered effective during a return stroke of the pusher for lifting the pusher from the bottom of the channel.

* * * * *